(12) United States Patent
Nakane

(10) Patent No.: US 10,138,858 B2
(45) Date of Patent: Nov. 27, 2018

(54) ENGINE CONTROL METHOD AND VEHICLE TRAVELING CONTROL DEVICE

(71) Applicant: NISSAN MOTOR CO., LTD., Kanagawa (JP)

(72) Inventor: Yusuke Nakane, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/746,830

(22) PCT Filed: Jul. 23, 2015

(86) PCT No.: PCT/JP2015/003701
§ 371 (c)(1),
(2) Date: Jan. 23, 2018

(87) PCT Pub. No.: WO2017/013693
PCT Pub. Date: Jan. 26, 2017

(65) Prior Publication Data
US 2018/0209355 A1    Jul. 26, 2018

(51) Int. Cl.
*F02N 11/08*    (2006.01)
*F02D 17/00*    (2006.01)
(Continued)

(52) U.S. Cl.
CPC .......... *F02N 11/0814* (2013.01); *F02D 17/00* (2013.01); *F02D 17/04* (2013.01);
(Continued)

(58) Field of Classification Search
CPC ........ F02D 17/00; F02D 17/02; F02D 41/062; F02D 41/065; F02D 41/123; F02N 11/0814; F02N 11/0833; F02N 11/844
(Continued)

(56) References Cited

U.S. PATENT DOCUMENTS

| 2003/0004635 A1* | 1/2003 | Kamiya | ................ | B60W 10/06 |
| | | | | 701/112 |
| 2013/0110382 A1* | 5/2013 | Ishikawa | ............. | F02N 11/0848 |
| | | | | 701/112 |

(Continued)

FOREIGN PATENT DOCUMENTS

| DE | 112012003475 T5 | 4/2014 |
| DE | 102014104614 A1 | 10/2014 |

(Continued)

*Primary Examiner* — Erick Solis
*Assistant Examiner* — Robert Werner
(74) *Attorney, Agent, or Firm* — Osha Liang LLP

(57) ABSTRACT

An engine control method includes determining an intention of a driver for acceleration during vehicle traveling, stopping fuel supply to an engine when a determination is made that the driver does not have the intention for acceleration, detecting a speed of the vehicle during inertial traveling, with fuel supply to the engine kept stopped, permitting restart of the engine when a determination is made that the driver has the intention for acceleration after stopping the fuel supply to the engine, prohibiting the restart of the engine until an engine rotational speed drops to or below a predetermined rotational speed threshold, even when the restart of the engine is permitted, restarting the engine after the engine rotational speed drops to or below the predetermined rotational speed threshold, and changing the rotational speed threshold depending on the detected speed. The rotational speed threshold increases with increase in the detected speed.

6 Claims, 12 Drawing Sheets

(51) Int. Cl.
*F02D 29/02* (2006.01)
*F02D 41/06* (2006.01)
*F02D 41/12* (2006.01)
*F02D 17/04* (2006.01)
*F02D 41/04* (2006.01)
*F02D 41/10* (2006.01)

(52) U.S. Cl.
CPC ........... *F02D 29/02* (2013.01); *F02D 41/062* (2013.01); *F02D 41/065* (2013.01); *F02D 41/123* (2013.01); *F02N 11/0844* (2013.01); *F02N 11/0855* (2013.01); *B60W 2510/108* (2013.01); *B60Y 2300/46* (2013.01); *F02D 41/042* (2013.01); *F02D 41/10* (2013.01); *F02D 2200/101* (2013.01); *F02D 2200/501* (2013.01); *F02D 2200/602* (2013.01); *F02N 2200/022* (2013.01); *F02N 2200/0801* (2013.01); *F02N 2200/0802* (2013.01)

(58) Field of Classification Search
USPC .............. 701/103, 104, 112, 113; 123/179.3, 123/179.4, 179.16
See application file for complete search history.

(56) References Cited

U.S. PATENT DOCUMENTS

2013/0151129 A1\* 6/2013 Tatewaki ................ F02D 45/00
 701/112
2016/0115931 A1\* 4/2016 Ishikawa ............ F02N 11/0844
 123/179.4

FOREIGN PATENT DOCUMENTS

| | | |
|---|---|---|
| EP | 2757012 A1 | 7/2014 |
| JP | H01-247739 A | 10/1989 |
| JP | 2004-011569 A | 1/2004 |
| JP | 2005-002847 A | 1/2005 |
| JP | 2013-122168 A | 6/2013 |
| JP | 2014-185595 A | 10/2014 |
| JP | 2015-068413 A | 4/2015 |
| WO | 2015/037053 A1 | 3/2015 |

\* cited by examiner

FIG. 7A ACCELERATOR
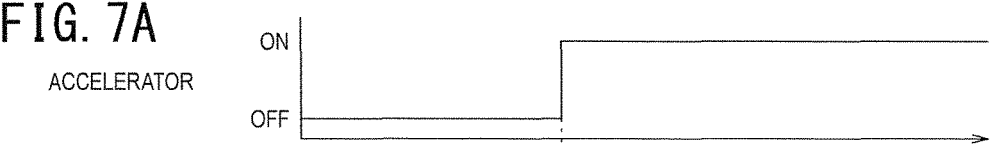
FIG. 7B INERTIAL TRAVELING STATUS
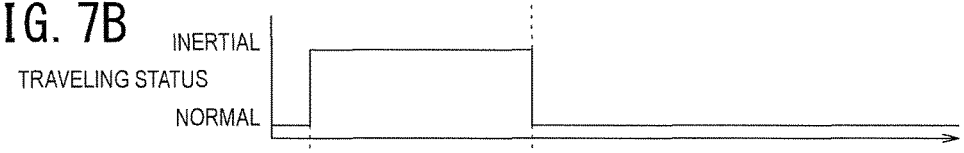
FIG. 7C ENGINE ROTATIONAL SPEED
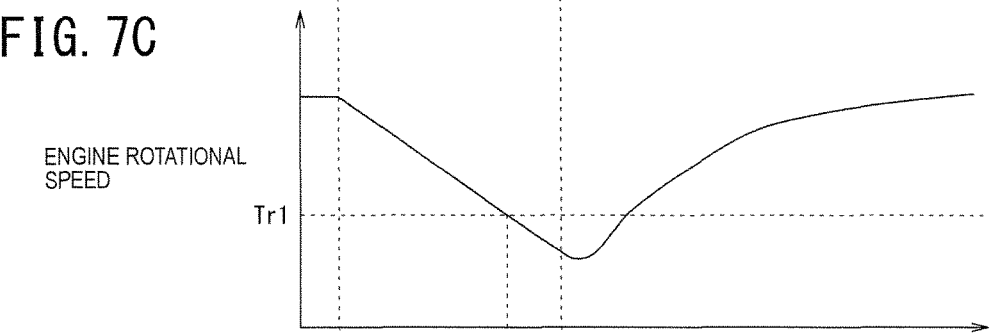
FIG. 7D MOTOR
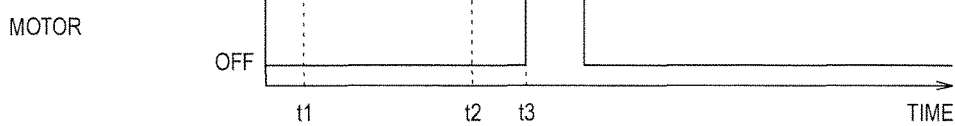

FIG. 8A ACCELERATOR
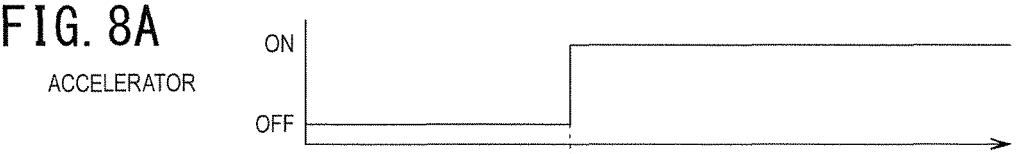
FIG. 8B INERTIAL TRAVELING STATUS
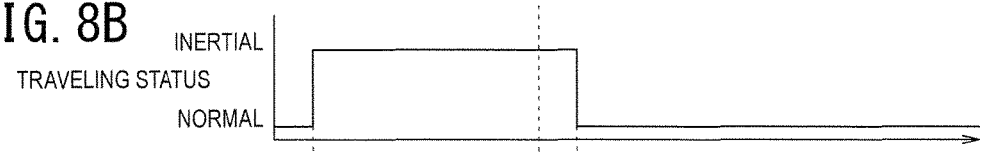
FIG. 8C ENGINE ROTATIONAL SPEED
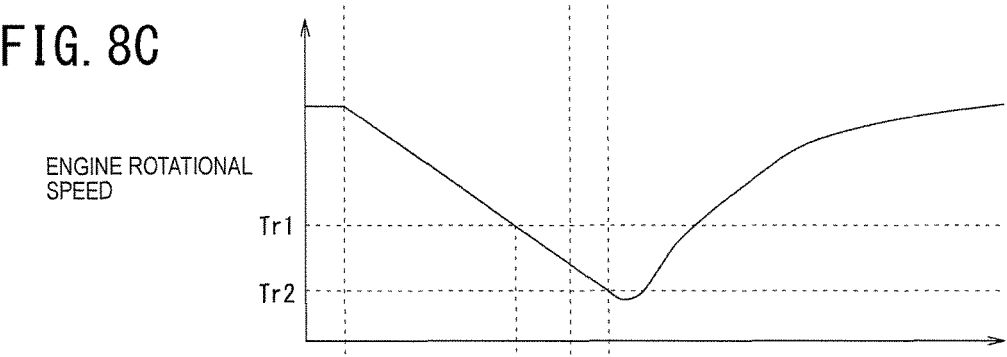
FIG. 8D MOTOR
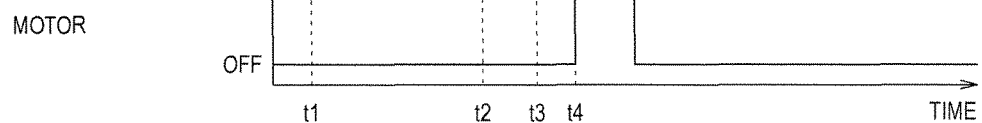

ENGINE CONTROL METHOD AND VEHICLE TRAVELING CONTROL DEVICE

BACKGROUND

Technical Field

The present intention relates to an engine control method and a vehicle traveling control device.

Related Art

JP-A-2015-68413 discloses a device for controlling a vehicle, which device, when a stop condition is satisfied during traveling, starts inertial traveling during which the vehicle travels with its engine kept stopped, and when a condition to restart the engine is satisfied, restarts the engine with the aid of a starter device.

SUMMARY OF INVENTION

The rotation of engines does not immediately stop even after the start of inertial traveling, and the engines rotate inertially. When a condition to stop inertial traveling is satisfied during this inertial rotation, a noise generated by the engine cranked during the inertial rotation may give the driver a discomfort feeling.

One or more embodiments of the present invention provides an engine control method and a vehicle traveling control device which can prevent a noise caused by the cranking of an engine during its inertial rotation from giving a driver a discomfort feeling when a condition to stop inertial traveling is satisfied during the inertial rotation.

According to one or more embodiments of the present invention, there is provided an engine control method, including: determining an intention of a driver for acceleration during vehicle traveling; stopping fuel supply to an engine when it is determined that the driver does not have the intention for acceleration; permitting restart of the engine when it is determined that the driver has the intention for acceleration after stopping the fuel supply to the engine; prohibiting the restart of the engine until an engine rotational speed drops to or below a predetermined rotational speed threshold, even when the restart of the engine is permitted; and restarting the engine after the engine rotational speed drops to or below the predetermined rotational speed threshold.

BRIEF DESCRIPTION OF DRAWINGS

FIGS. 7A to 7D are time charts explaining a first operation example of the vehicle traveling control device;

FIGS. 8A to 8D are time charts explaining a second operation example of the vehicle traveling control device;

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment (Configuration)

Figure 1:
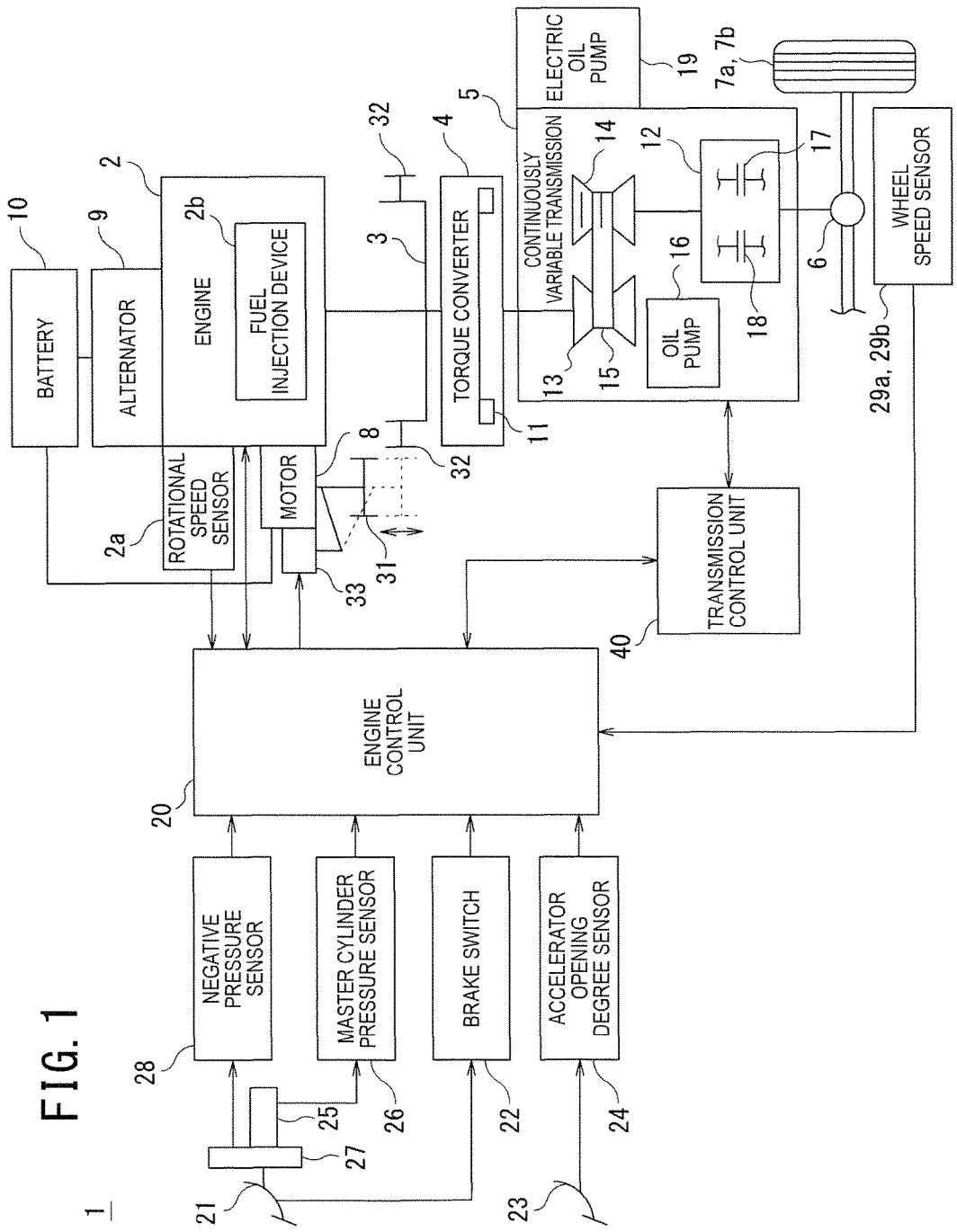
FIG. 1 is a schematic configuration diagram of a vehicle equipped with a vehicle traveling control device according to a first embodiment.

An inertial traveling control device according to a first embodiment will be described below. See FIG. 1. An engine 2 which is the internal combustion engine of a vehicle 1 is provided with a torque converter 4 on the output side of the engine. The torque converter 4 is connected to a belt type, continuously variable transmission 5 on the output side of the converter. Rotational driving force output from the engine 2 is input via a drive plate 3 to the torque converter 4, from which the force is further input to the continuously variable transmission 5. The rotational driving force input to the continuously variable transmission 5 is changed according to a desired gear ratio and then transmitted via a differential gear 6 to drive wheels 7a and 7b. The engine 2 is provided with a motor 8 for starting the engine, an alternator 9 for generating electrical power, and a battery 10.

The torque converter 4 amplifies torque during low speed traveling. The torque converter 4 has a lock-up clutch 11. When the speed V of the vehicle 1 is equal to or faster than a predetermined speed V1, the torque converter 4 engages the lock-up clutch 11, to regulate the relative rotation between the output shaft of the engine 2 and the input shaft of the continuously variable transmission 5. The predetermined speed V1 may be, for example, 14 km/h.

The continuously variable transmission 5 is provided with a forward-reverse switching mechanism 12, a primary pulley 13 and a secondary pulley 14, and a belt 15 set across the primary pulley 13 and the secondary pulley 14. The groove widths of the primary pulley 13 and the secondary pulley 14 are varied by hydraulic control, to achieve a desired gear ratio.

The forward-reverse switching mechanism 12 is provided with a forward clutch 17 and a reverse brake 18. The forward clutch 17 and the reverse brake 18 are frictionally engaging elements for transmitting rotation transmitted from the secondary pulley 14 in a positive direction (forward direction) and in a negative direction (reverse direction), respectively. The forward clutch 17 and the reverse brake 18 are examples of clutch which transmit the driving force of the engine 2 to the drive wheels 7a and 7b.

In addition, in the continuously variable transmission 5 is provided with an oil pump 16 driven by the engine 2. When the engine is in operation, the oil pump 16, as a hydraulic source, supplies the converter pressure of the torque converter 4 and the clutch pressure of the lock-up clutch 11.

Further, the oil pump 16, as a hydraulic source, supplies the pulley pressure of the continuously variable transmission 5 and clutch engagement pressure for the forward clutch 17 and the reverse brake 18. Still further, the continuously variable transmission 5 is provided with an electric oil pump 19, in addition to the oil pump 16, and is configured so as to be capable of supplying necessary oil pressure to each actuator by activating the electric oil pump 19 when automatic engine stop makes hydraulic supply by the oil pump 16 impossible. Thus, the leakage of hydraulic oil can be compensated and the clutch engagement pressure can be maintained even during engine stop.

The operation status of the engine 2 is controlled by an engine control unit 20. To the engine control unit 20 is input a rotational speed signal indicating an engine rotational speed Re from a rotational speed sensor 2a for detecting the engine rotational speed Re of the engine 2. The rotational speed sensor 2a is one example of an engine rotational speed detection device for detecting the engine rotational speed Re of the engine 2.

Further, to the engine control unit 20 is input a brake signal from a brake switch 22 for outputting an ON signal according to the operation of a brake pedal 21 by a driver. The brake pedal 21 is one example of an operation element operated by a driver to instruct the braking force of the vehicle 1.

A master cylinder 25 and a master back 27 are provided ahead of the brake pedal 21. The master back 27 amplifies brake operation force with the aid of the intake negative pressure of the engine 2. The engine control unit 20 receives a brake pedal operation degree signal from a master cylinder pressure sensor 26 for detecting the master cylinder pressure of the master cylinder 25 generated on the basis of the operation degree of the brake pedal 21. Further, the engine control unit 20 receives a negative pressure signal from a negative pressure sensor 28 for detecting the negative pressure of the master back 27.

Another sensor, such as a sensor for detecting brake pedal stroke degree and brake pedal depression force or a sensor for detecting wheel cylinder pressure may be used, instead of the master cylinder pressure sensor 26, to detect the brake pedal operation degree, which is input to the engine control unit 20.

Further, the engine control unit 20 receives an accelerator pedal operation degree signal from an accelerator pedal opening degree sensor 24 for detecting the operation degree of an accelerator pedal 23 operated by a driver. The accelerator pedal 23 is one example of an operation element operated by the driver to instruct the driving force of the vehicle 1. The accelerator pedal opening degree sensor 24 is one example of an accelerator depression degree detection device for detecting accelerator depression degree which is the degree of depression of the accelerator pedal 23 by the driver.

Still further, the engine control unit 20 receives wheel speed signals indicating wheel speeds detected by wheel speed sensors 29a and 29b provided on the drive wheels 7a and 7b. In the following explanation, the wheel speed sensors 29a and 29b may be collectively represented as "wheel speed sensors 29." The wheel speed sensors 29 may be provided on wheels other than the drive wheels. Hereinafter, the drive wheels 7a and 7b, and wheels other than the drive wheels may be collectively represented as "wheels 7."

Still further, the engine control unit 20 receives a transmission status signal from a transmission control unit 40 to be described later and signals of an engine water temperature, a crank angle, and the like.

The engine control unit 20 controls, on the basis of the above-mentioned various signals, a fuel injection device 2b which is provided on the engine 2 and capable of adjusting fuel to be supplied to the engine 2. Thus, the engine control unit 20 is one example of a control device for controlling the fuel injection device 2b. Further, the engine control unit 20 starts the engine 2 and performs an automatic stop processing of the engine 2 to be described later, on the basis of the above-mentioned various signals.

When starting the engine 2, the engine control unit 20 cranks the engine with the aid of the motor 8. The motor 8 may be, for example, a starter motor for engine start (i.e., starting motor). Thus, the engine control unit 20 is one example of a control device for controlling the motor 8.

The engine control unit 20, during the cranking, moves a pinion gear 31 fixed to the drive shaft of the motor 8 from a first position where the gear is disengaged from a ring gear 32 fixed to the perimeter of the drive plate 3 to a second position where the gear is engaged with the ring gear 32. The motor 8 is provided with an actuator 33 for moving the pinion gear 31 between the first and second positions.

For example, when the engine control unit 20 energizes the actuator 33, the pinion gear 31 advances from the first position to the second position, and when the actuator 33 is not energized, the pinion gear 31 goes back from the second position to the first position. With the pinion gear 31 kept engaged with the ring gear 32, the engine is cranked by the rotation of the motor 8 supplied with electric power from the battery 10. Then, the fuel injection device 2b injects fuel into the engine 2, and after the engine 2 reaches its self-sustained rotation, the motor 8 is stopped. The alternator 9, rotationally driven by the engine 2, generates electrical power, which is supplied to a device such as the battery 10. The ring gear 32 is one example of the first gear on the side of the engine 2. The pinion gear 31 is one example of the second gear on the side of the motor 8.

The transmission control unit 40 receives an engine status signal indicating an engine operation status from the engine control unit 20 and sends a transmission status signal indicating the status of the continuously variable transmission 5 to the engine control unit 20. The transmission control unit 40 controls, for example, the gear ratio of the continuously variable transmission 5, on the basis of these signals.

For example, the transmission control unit 40, when D-range is selected, engages the forward clutch 17, and further determines the gear ratio from a gear ratio map on the basis of the accelerator pedal opening degree and the speed V, to control each pulley pressure.

Further, when the speed V is less than the predetermined speed V1, the transmission control unit releases the lock-up clutch 11, but when the speed is equal to or more than the predetermined speed V1, the transmission control unit engages the lock-up clutch, to bring the engine 2 and the continuously variable transmission 5 into a directly connected status.

The engine control unit 20 and the transmission control unit 40 may be, for example, computers including a CPU (Central Processing Unit) and a peripheral component for CPU such as a storage device. Respective functions of these computers described herein are implemented by the respective CPUs executing computer programs stored in the storage devices.

(Automatic Stop Processing of Engine)

Next, automatic stop processing of the engine 2 will be explained. The automatic stop processing is a processing in which the engine control unit 20 stops and restarts the engine 2 automatically when predetermined conditions are satisfied, respectively. For this purpose, the engine control unit 20, the transmission control unit 40, the motor 8, the rotational speed sensor 2a, the fuel injection device 2b, the accelerator opening degree sensor 24, and the wheel speed sensors 29 configure a vehicle traveling control device 41 which performs the automatic stop processing of the engine 2.

Figure 2:
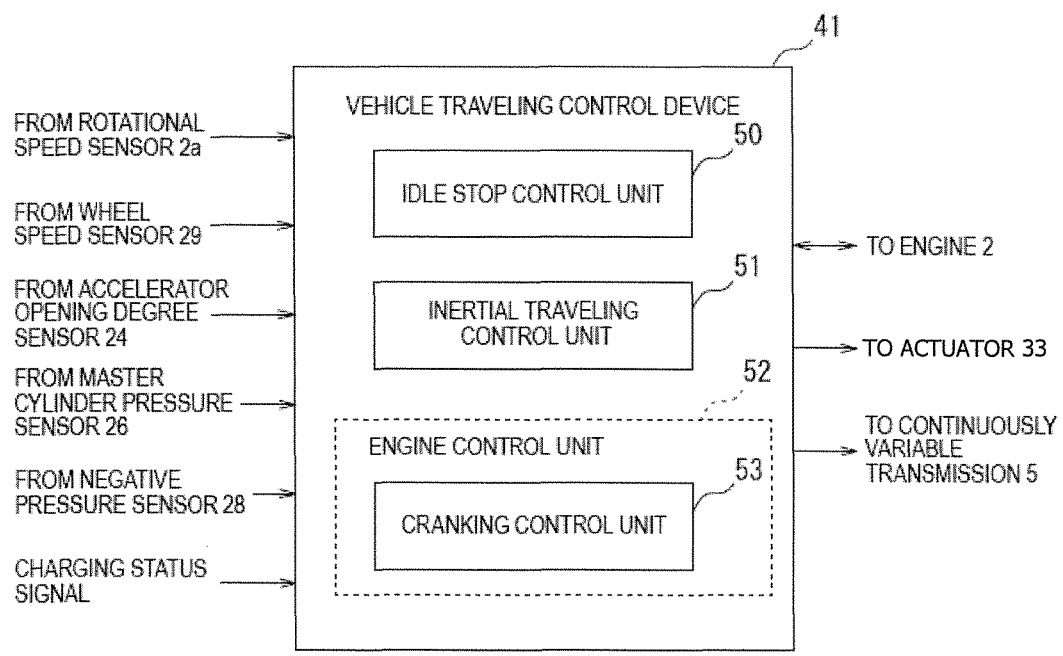
FIG. 2 is a functional configuration diagram of the vehicle traveling control device according to the first embodiment.

See FIG. 2. The vehicle traveling control device 41 is provided with an idle stop control unit 50, an inertial traveling control unit 51, and an engine control unit 52. The idle stop control unit 50 performs so-called idle stop (also called idle reduction) control which stops engine idling when a predetermined condition is satisfied while the vehicle 1 is stopped. A detailed description of the idle stop control is omitted.

The inertial traveling control unit 51 stops fuel supply to the engine 2, disconnects the engine 2 from the drive wheels 7a and 7b, and run the vehicle 1 as is when a predetermined first inertial traveling condition is satisfied even if the speed V is equal to or faster than a speed threshold V2 which is faster than the predetermined speed V1. Herein, a representation "first inertial traveling" means traveling during which the speed V is equal to or faster than the speed threshold V2, fuel supply to the engine 2 is kept stopped, and the engine 2 is kept disengaged from the drive wheels 7a and 7b. Further, a representation "normal traveling" means traveling during which the forward clutch 17 is kept engaged, in other words, the engine 2 is kept engaged with the drive wheels 7a and 7b, and fuel is kept supplied to the engine 2.

The inertial traveling control unit 51 receives wheel speed signals from wheel speed sensors 29, an accelerator pedal operation degree signal from the accelerator pedal opening degree sensor 24, a brake pedal operation degree signal from the master cylinder pressure sensor 26, a negative pressure signal from the negative pressure sensor 28, and a charging status signal from the battery 10. The inertial traveling control unit 51 determines whether or not the first inertial traveling condition is satisfied, on the basis of the wheel speed signals, the accelerator pedal operation degree signal, and the charging status signal.

The first inertial traveling condition is satisfied, for example, when all of the following four conditions (A1) to (A4) are satisfied.

(A1) The speed V is equal to or faster than the speed threshold V2. The speed threshold V2 may be about 30 km/h.

(A2) The speed V is equal to or slower than a speed V3. For an example, the speed V3 may be about 80 km/h.

(A3) The driver has no intention for acceleration. For example, when a time equal to longer than a predetermined time elapses after accelerator operation degree (i.e., accelerator depression degree) drops to zero, the condition (A3) may be determined to be satisfied. The predetermined time is a period during which the accelerator pedal 23 is not operated, the period being set in order to determine that the driver has no intention for acceleration, and it may be, for example, 2 seconds.

(A4) A predetermined idle stop permission condition is satisfied. The idle stop permission condition may be, for example, that the engine is not under warming-up, and that the charging ratio of the battery 10 is equal to or higher than a predetermined value.

The inertial traveling control unit 51 permits first inertial traveling and outputs an engine stop command to the engine control unit 52 when the first inertial traveling condition is satisfied, in other words, when the driver has no intention for acceleration and other conditions (A1), (A2), and (A4) are satisfied.

The engine control unit 52 stops fuel injection by the fuel injection device 2b, to stop fuel supply to the engine 2. Further, the engine control unit 52 outputs an operation prohibition command for the electric oil pump 19 to the continuously variable transmission 5. Since the oil pump 16 is stopped owing to the stop of the engine 2, and in addition, the electric oil pump 19 does not operate, the forward clutch 17 in the forward-reverse switching mechanism 12 is released. As a result, the engine 2 is disengaged from the drive wheels 7a and 7b. In addition, the lock-up clutch 11 is also released.

Further, during the first inertial traveling, the inertial traveling control unit 51 determines whether or not a predetermined first stop condition is satisfied, on the basis of the wheel speed signals, the accelerator pedal operation degree signal, and the charging status signal. When the first stop condition is satisfied, the inertial traveling control unit 51 prohibits the first inertial traveling, to stop the first inertial traveling. The first stop condition is satisfied when, for example, any one of the following three conditions (B1) to (B3) is satisfied.

(B1) The speed V is slower than the speed threshold V2.

(B2) The driver has an intention for acceleration. For example, the condition (B2) may be determined to be satisfied when the accelerator pedal 23 is depressed.

(B3) The idle stop permission condition is not satisfied.

When the first stop condition is satisfied, for example, when the driver has an intention for acceleration, the inertial traveling control unit 51 stops the first inertial traveling and outputs a restart command aided by the motor 8 to the engine control unit 52.

Upon receiving the restart command, the engine control unit 52 performs engine cranking with the aid of the motor 8. In this case, the engine 2 may be under inertial rotation in the transition to its stopped status. Examples of such status include Change of Mind (CoM) such that acceleration operation is performed by a driver immediately after the first inertial traveling is started.

When cranking is performed during the inertial rotation of the engine 2, a noise occurs which is caused by the engagement of the pinion gear 31 with the rotating ring gear 32. In the following explanation, a representation "starter noise" means the noise caused by the engagement of the pinion gear 31 with the rotating ring gear 32. The starter noise increases when the engine rotational speed Re is higher.

Then, the engine control unit 52 permits cranking of the engine 2 with the aid of the motor 8 when the engine rotational speed Re of the engine 2 during inertial rotation is equal to or slower than a rotational speed threshold Tr. In other words, the unit permits the restart of the engine 2. When the engine rotational speed Re is higher than the rotational speed threshold Tr, the unit prohibits the cranking of the engine 2 with the aid of the motor 8 until the engine rotational speed Re drops to or below the rotational speed threshold Tr. In other words, the engine control unit prohibits the restart of the engine 2. The engine control unit performs the cranking of the engine 2 after the engine rotational speed Re drops to or below the rotational speed threshold Tr. In other words, the unit restarts the engine 2.

The engine control unit 52 is provided with a cranking control unit 53. The cranking control unit 53 determines the engine rotational speed Re on the basis of the rotational speed signal from the rotational speed sensor 2a. The cranking control unit 53 permits cranking of the engine 2 with the aid of the motor 8 and starts the cranking when the engine rotational speed Re is equal to or lower than the rotational speed threshold Tr.

The cranking control unit 53 energizes the actuator 33 to engage the pinion gear 31 with the ring gear 32 and drives the motor 8 to crank the engine 2. The engine control unit 52 restarts fuel injection by the fuel injection device 2b of the engine 2. The engine 2 is restarted through the restart of fuel injection and the cranking.

After the engine 2 is restarted, the oil pump 16 operates to engage the forward clutch 17 in the forward-reverse switching mechanism 12.

When the engine rotational speed Re is higher than the rotational speed threshold Tr, the cranking control unit 53 prohibits cranking of the engine 2 with the aid of the motor 8 until the engine rotational speed Re drops to or below the rotational speed threshold Tr.

Next, when it is determined that the vehicle 1 is under deceleration and likely to stop via control called "deceleration fuel cut control" and to transfer to the idling stop control, fuel supply to the engine 2 is stopped. In this case, the vehicle 1 is traveling by inertia, with the accelerator pedal 23 not operated by the driver. A representation "second inertial traveling" means traveling during which fuel supply to the engine 2 is kept stopped when it is determined that the vehicle is likely to transfer to the idling stop control. The first inertial traveling and the second inertial traveling may be collectively represented as "inertial traveling." The second inertial traveling may be called coast stop traveling, and a control for stopping fuel supply to the engine 2 during the coast stop traveling may be called coast stop control.

Although fuel injection is kept stopped during the deceleration fuel cut control, the engine rotational speed Re is maintained by coast torque transmitted via the lock-up clutch 11 from the drive wheels 7a and 7b. However, since the lock-up clutch 11 is released after deceleration down to the predetermined speed V1, the engine 2 will be stopped if no fuel is injected thereto. For this reason, in conventional technologies, the deceleration fuel cut control is stopped at a timing of releasing the lock-up clutch 11, and fuel injection is restarted to maintain self-sustained engine rotation; the engine idling is then stopped after the vehicle 1 was completely stopped. However, fuel efficiency can be improved if the amount of fuel upon the restart of fuel injection can be further reduced in a process in which fuel injection is temporarily restarted after such a traveling status with fuel injection kept stopped and then the engine is stopped again. Accordingly, when a predetermined second inertial traveling condition is satisfied, the engine 2 is kept stopped without restarting fuel injection, and after the vehicle 1 is stopped, it transfers directly to the normal idling stop control.

The inertial traveling control unit 51 determines whether or not the second inertial traveling condition is satisfied, on the basis of the accelerator pedal operation degree signal, the brake pedal operation degree signal, and the charging status signal. The second inertial traveling condition is satisfied, for example, when all of the following three conditions (C1) to (C3) are satisfied.

(C1) The brake pedal operation degree is equal to or greater than a predetermined value.
(C2) The accelerator pedal operation degree is zero.
(C3) The idle stop permission condition is satisfied.

When the second inertial traveling condition is satisfied, the inertial traveling control unit 51 outputs the engine stop command to the engine control unit 52. Upon the automatic stop of the engine 2, the continuously variable transmission 5 activates the electric oil pump 19, to maintain the engagement of the forward clutch 17 of the forward-reverse switching mechanism 12. Thus, the engagement of the engine 2 with the drive wheels 7a and 7b is maintained. Since the second inertial traveling starts after the deceleration fuel cut control, the speed V during the second inertial traveling is slower than the predetermined speed V1.

During the second inertial traveling, the inertial traveling control unit 51 determines whether or not a predetermined second stop condition is satisfied, on the basis of the negative pressure signal and the charging status signal. When the second stop condition is satisfied, the inertial traveling control unit 51 prohibits the second inertial traveling and stops the second inertial traveling. The second stop condition is satisfied, for example, when any one of the following two conditions (D1) and (D2) is satisfied.

(D1) The negative pressure of the master back 27 is less than a predetermined value.
(D2) The idle stop permission condition is not satisfied.

When the second stop condition is satisfied, the inertial traveling control unit 51 outputs a restart command to the engine control unit 52. The engine control unit 52, upon receiving the restart command, cranks the engine with the aid of the motor 8.

The engine control unit 52 may permit cranking of the engine 2 with the aid of the motor 8 when the engine rotational speed Re is equal to or lower than the rotational speed threshold Tr, as with the case of cranking at the end of the first inertial traveling. Further, when the engine rotational speed Re is higher than the rotational speed threshold Tr, the engine control unit 52 may prohibit cranking of the engine 2 with the aid of the motor 8 until the engine rotational speed Re drops to or below the rotational speed threshold Tr.

As described above, the inertial traveling control unit 51 can improve the fuel efficiency of the vehicle 1 by increasing an occasion of engine stop by the first inertial traveling and the second inertial traveling.

(Operation)

Figure 3:
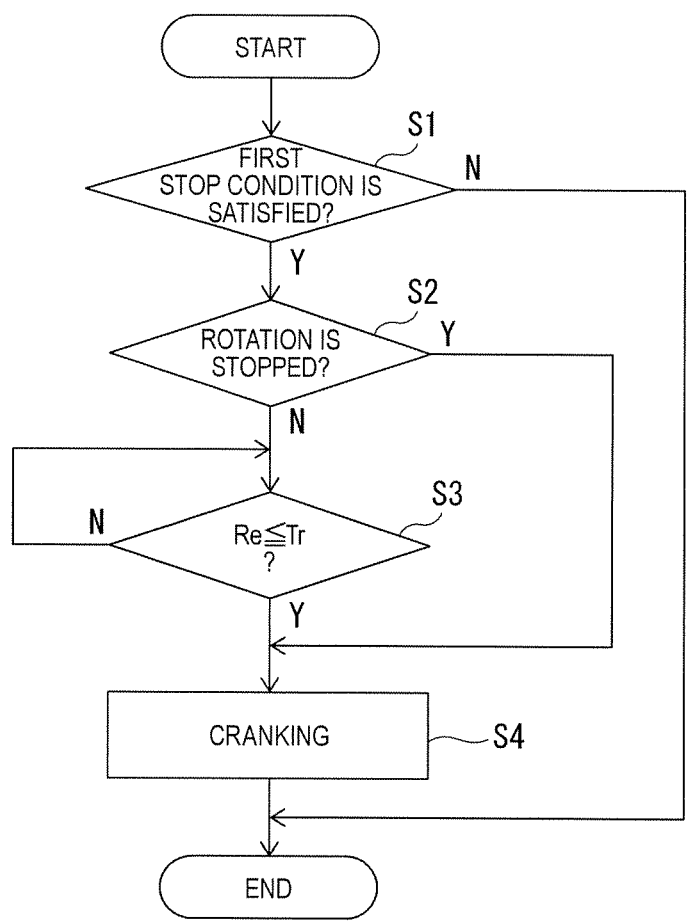
FIG. 3 is a flowchart explaining a first processing example by the vehicle traveling control device.

Next, a first example of the processing of the vehicle traveling control device 41 will be explained. See FIG. 3. At a step S1, the inertial traveling control unit 51 determines whether or not the first stop condition is satisfied. When the first stop condition is satisfied (step S1: Y), the processing goes to a step S2. When the first stop condition is not satisfied (step S1: N), the processing ends.

At the step S2, the cranking control unit 53 determines whether or not the rotation of the engine 2 is stopped, on the basis of the rotational speed signal from the rotational speed sensor 2a. When the rotation of the engine 2 is stopped (step S2: Y), the processing goes to the step S4. When the rotation of the engine 2 is not stopped (step S2: N), the processing goes to a step S3.

At the step S3, the cranking control unit 53 determines whether or not the engine rotational speed Re is equal to or less than the rotational speed threshold Tr.

When the engine rotational speed Re is lower than the rotational speed threshold Tr (step S3: Y), the processing goes to the step S4. When the engine rotational speed Re is higher than the rotational speed threshold Tr (step S3: N), the processing returns to the step S3.

At the step S4, the cranking control unit 53 starts cranking of the engine 2 with the aid of the motor 8. The engine control unit 52 restarts fuel injection by the fuel injection device 2b. The engine 2 is restarted by the restart of fuel injection and the cranking.

(1) The inertial traveling control unit 51 in one or more embodiments of the present invention determines driver's intention for acceleration during the traveling of the vehicle 1. The engine control unit 52 stops fuel supply to the engine 2 by the fuel injection device 2b when it is determined that the driver has no intention for acceleration. The inertial traveling control unit 51 permits the restart of the engine 2 when it is determined, after fuel supply to the engine 2 is stopped, that the driver has an intention for acceleration.

However, the cranking control unit 53 prohibits the restart of the engine until the engine rotational speed Re drops to or below the rotational speed threshold Tr even when the inertial traveling control unit 51 permits the restart of the engine 2. In other words, the cranking control unit 53 prohibits the restart of the engine until the engine rotational speed Re drops to or below the rotational speed threshold Tr, even when it is determined that the driver has an intention for acceleration after fuel supply to the engine 2 is stopped. The cranking control unit 53 restarts the engine 2 after the engine rotational speed Re drops to or below the rotational speed threshold Tr.

Accordingly, when a condition for stopping inertial traveling is satisfied during inertial rotation, a noise caused by cranking of the engine during the inertial rotation can be prevented from giving the driver a discomfort feeling.

Although the timing of cranking the engine 2 is delayed, a period during which cranking of the engine 2 is prohibited expires within a period required for the shift of the continuously variable transmission 5. Accordingly, even when cranking is delayed, it does not affect response.

Modification Example (1) The motor 8 may be an SSG (Separated Starter Generator) motor provided separately from the starter motor. Cranking performed during inertial rotation causes a noise caused by the backlash of a transmission system transmitting rotational driving force between the drive shaft of the SSG and that of the engine 2, and this noise increases with increase in the engine rotational speed Re. Therefore, even in the case of SSG, the cranking noise during low speed traveling can be prevented from giving the driver a discomfort feeling, by prohibiting cranking of the engine 2 with the aid of SSG when the engine rotational speed Re is higher than the rotational speed threshold Tr.

(2) The vehicle traveling control device 41 can also be applied to vehicles adopting an automatic transmission of a type other than the continuously variable transmission 5. For example, the vehicle traveling control device 41 can also be applied to vehicles adopting an automatic transmission of a type with a gear pair with parallel axis. Further, the vehicle traveling control device 41 can be applied not only to vehicles provided with only an internal combustion engine as a driving source, but also to hybrid vehicles.

(3) During the first inertial traveling, the vehicle traveling control device 41 may output, to the continuously variable transmission 5, a clutch disengagement signal for actively releasing the forward clutch 17, instead of the operation prohibition command for the electric oil pump 19.

Second Embodiment

Next, a second embodiment will be explained. Noise sensible for the driver of the vehicle 1 includes a background noise occurring during traveling, in addition to starter noise. Since the background noise includes the traveling noise of the vehicle 1, the background noise increases with increase in the speed V. Even though the starter noise is large to some extent, it is not significant when the speed V is high and the background noise is large. On the other hand, even though the starter noise is small to some extent, it may be significant to give the driver a discomfort feeling when the speed V is slow and the background noise is small. In other words, when a difference (I0–I1) obtained by subtraction of the magnitude I1 of the background noise from the magnitude I0 of the starter noise, is large, it may give the driver a discomfort feeling.

For this reason, the engine control unit 52 determines the rotational speed threshold Tr according to the speed V of the vehicle 1, the threshold being the upper limit of the engine rotational speed Re for which cranking is permitted. When the engine rotational speed Re of the engine 2 during inertial rotation is equal to or slower than the rotational speed threshold Tr determined according to the speed V, the engine control unit 52 permits the cranking of the engine 2 with the aid of the motor 8. When the engine rotational speed Re is faster than the rotational speed threshold Tr determined according to the speed V, the cranking of the engine 2 with the aid of the motor 8 is prohibited until the engine rotational speed Re drops to or below the rotational speed threshold Tr.

Figure 4:
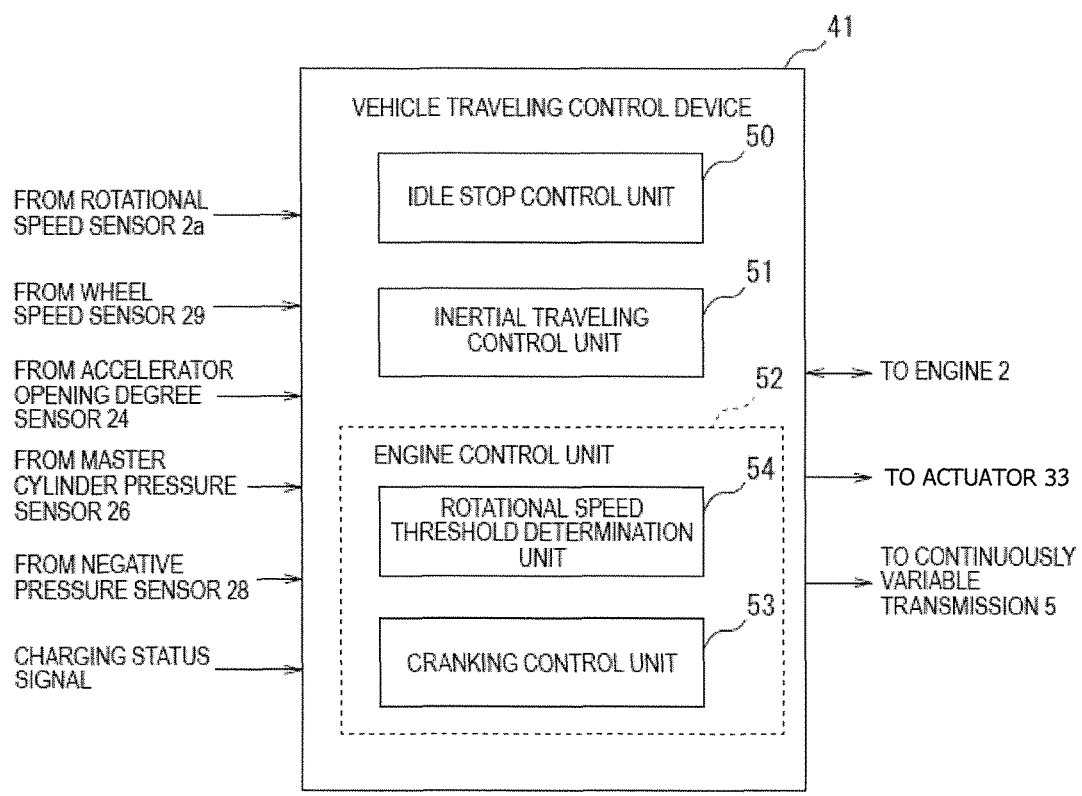
FIG. 4 is a functional configuration diagram of a vehicle traveling control device according to a second embodiment.

See FIG. 4. The same reference signs are used for the components similar to those in the first embodiment. The engine control unit 52 is provided with a rotational speed threshold determination unit 54. The rotational speed threshold determination unit 54 determines the speed V of the vehicle 1 on the basis of wheel speed signals from the wheel speed sensors 29. The rotational speed threshold determination unit 54 determines different rotational speed thresholds Tr according to different speeds V.

Figure 5A:
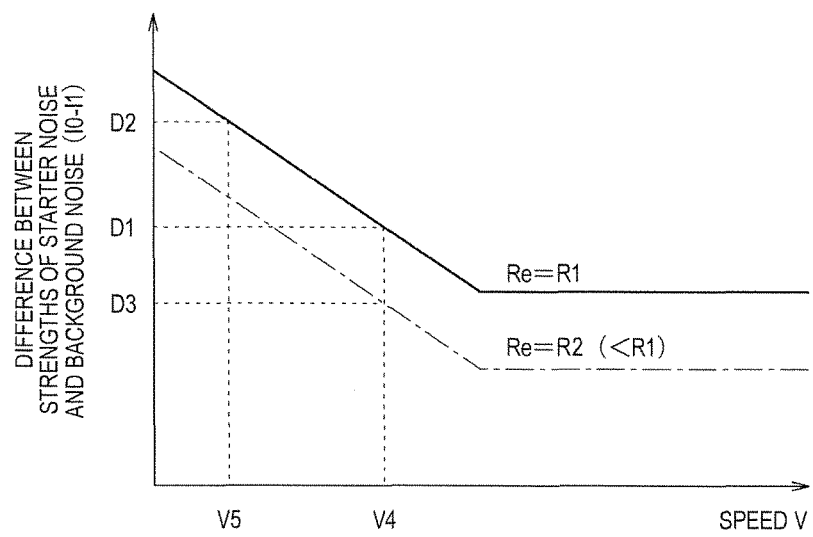
FIGS. 5A and 5B are explanatory drawings of a first setting example of a rotational speed threshold.

See FIG. 5A. The difference (I0–I1) obtained by subtraction of the magnitude I1 of the background noise from the magnitude I0 of the starter noise, decreases with the increase in the speed V. For example, when the engine rotational speed Re is "R1" and the speed V is "V4", the difference (I0–I1) is "D1", which is smaller than "D2" taken by the difference (I0–I1) when the speed V is "V5" lower than "V4."

The difference (I0–I1) increases with increase in the engine rotational speed Re. For example, "D1" taken by the difference (I0–I1) for a speed V equal to "V4" and an engine rotational speed Re equal to "R1" is larger than "D3" taken by the difference (I0–I1) for an engine rotational speed Re equal to "R2" lower than "R1."

Therefore, the rotational speed threshold determination unit 54 sets an engine rotational speed Re at which the difference (I0–I1) is a predetermined allowable value Ti at a speed V determined on the basis of the wheel speed signals from the wheel speed sensors 29, as a rotational speed threshold Tr.

A rotational speed during inertial rotation for which cranking is permitted is limited by a cranking mechanism (such as the pinion gear 31 and the ring gear 32) for transmitting the rotational driving force of the motor 8 to the drive shaft of the engine 2. Therefore, the rotational speed threshold determination unit 54 may set a maximum value allowable for the cranking mechanism to the rotational speed threshold Tr when the speed V is equal to or faster than a predetermined speed threshold.

Figure 5B:
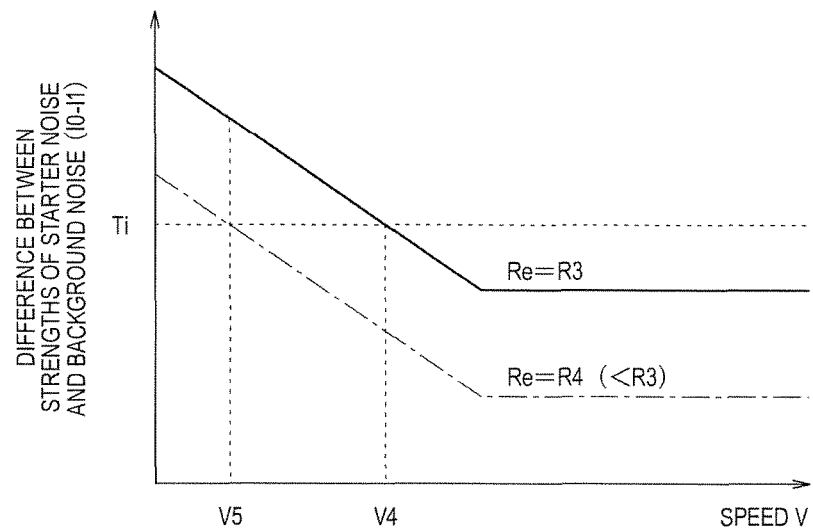

See FIG. 5B. For example, when the difference (I0–I1) is the predetermined allowable value Ti at a speed V equal to "V4" and an engine speed Re equal to "R3", the engine rotational speed R3 is set as the rotational speed threshold Tr. Further, for example, when the difference (I0–I1) is the predetermined allowable value Ti at a speed V equal to "V5" and an engine rotational speed Re equal to "R4", the engine rotational speed R4 is set as the rotational speed threshold Tr. In this example, the speed V4 is faster than the speed V5, and the engine rotational speed R3 is higher than the engine rotational speed R4. In other words, the rotational speed threshold Tr increases with increase in the speed V.

When the rotational speed threshold Tr is set, the magnitude of each starter noise at each engine rotational speed Re and the magnitude I1 of each background noise at each speed V are measured in advance. Next, respective differences (I0–I1) for different combinations of the engine rotational speed Re and the speed V are estimated. Then, a rotational speed threshold Tr such that the difference (I0–I1) is the allowable value Ti is estimated on the basis of these estimated values.

See FIG. 4. The cranking control unit 53 determines the engine rotational speed Re on the basis of the rotational speed signal from the rotational speed sensor 2a. The cranking control unit 53 permits cranking of the engine 2 with the aid of the motor 8 and starts the cranking when the engine rotational speed Re is equal to or lower than the rotational speed threshold Tr determined by the rotational speed threshold determination unit 54.

When the engine rotational speed Re is higher than the rotational speed threshold Tr determined by the rotational speed threshold determination unit 54, the cranking control unit 53 prohibits the cranking of the engine 2 with the aid of the motor 8 until the engine rotational speed Re drops to or below the rotational speed threshold Tr.

(Operation)

Figure 6:
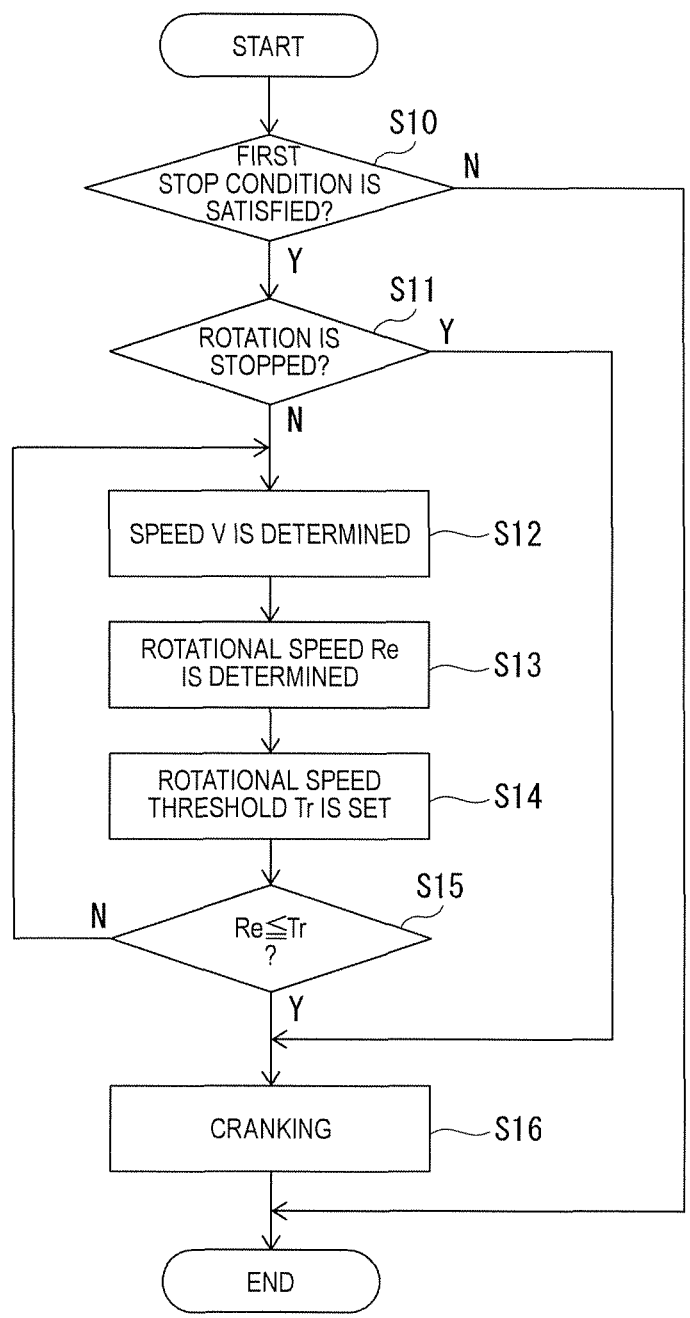
FIG. 6 is a flowchart explaining a second processing example by the vehicle traveling control device.

Next, a second example of the processing of the vehicle traveling control device 41 will be explained. See FIG. 6. At a step S10, the inertial traveling control unit 51 determines whether or not the first stop condition is satisfied. When the first stop condition is satisfied (step S10: Y), the processing goes to a step S11. When the first stop condition is not satisfied (step S10: N), the processing ends.

At the step S11, the cranking control unit 53 determines whether or not the rotation of the engine 2 is stopped, on the basis of the rotational speed signal from the rotational speed sensor 2a. When the rotation of the engine 2 is stopped (step S11: Y), the processing goes to the step S16. When the rotation of the engine 2 is not stopped (step S11: N), the processing goes to a step S12.

At the step S12, the rotational speed threshold determination unit 54 determines the speed V of the vehicle 1. At a step S13, the cranking control unit 53 determines the engine rotational speed Re. At a step S14, the rotational speed threshold determination unit 54 determines the rotational speed threshold Tr. The rotational speed threshold determination unit 54 may determine the rotational speed threshold Tr before the cranking control unit 53 determines the engine rotational speed Re. In other words, the step S14 may be executed before the step S13.

At a step S15, the cranking control unit 53 determines whether or not the engine rotational speed Re is equal to or lower than the rotational speed threshold Tr.

When the engine rotational speed Re is equal to or lower than the rotational speed threshold Tr (step S15: Y), the processing goes to a step S16. When the engine rotational speed Re is higher than the rotational speed threshold Tr (step S15: N), the processing goes back to the step S12.

At the step S16, the cranking control unit 53 starts cranking of the engine 2 with the aid of the motor 8. The engine control unit 52 restarts fuel injection by the fuel injection device 2b. The engine 2 is restarted by the restart of fuel injection and the cranking.

Next, an example of the operation of the vehicle traveling control device 41 at the end of the first inertial traveling is will be explained. It is supposed that the speed V is relatively fast and the rotational speed threshold Tr is "Tr1" which is relatively large. The real rotational speed threshold Tr varies depending on the decrease in the speed V during the first inertial traveling.

As illustrated in FIG. 7B, the first inertial traveling condition is satisfied at a time t1, and the first inertial traveling is started. When the engine stops owing to the start of the first inertial traveling, the engine rotational speed Re begins decreasing, as illustrated FIG. 7C, and drops to or below Tr1 after a time t2.

Further, when the accelerator pedal 23 is depressed at a time t3 as illustrated in FIG. 7A and the first stop condition is satisfied, the inertial traveling control unit 51 outputs the restart command for the engine 2 to the engine control unit 52.

Since the engine rotational speed Re is lower than the rotational speed threshold Tr1 at the time t3, the cranking control unit 53 permits cranking of the engine 2 with the aid of the motor 8. Accordingly, the motor 8 is driven at the time t3, as illustrated in FIG. 7D. As a result, the status of the vehicle 1 returns to a normal traveling, as illustrated in FIG. 7B.

Next, it is supposed that the rotational speed threshold Tr is "Tr2" which is smaller than "Tr1." When the accelerator pedal 23 is depressed at the time t3 as illustrated in FIG. 8A and the first stop condition is satisfied, the inertial traveling control unit 51 outputs the restart command for the engine 2 to the engine control unit 52. Since the engine rotational speed Re is higher than the rotational speed threshold Tr2 at the time t3 as illustrated in FIG. 8C, the cranking control unit 53 prohibits the cranking of the engine 2 with the aid of the motor 8. Accordingly, the motor 8 is not driven at the time t3, as illustrated in FIG. 8D.

Further, when the engine rotational speed Re drops to or below the rotational speed threshold Tr2 at a time t4 as illustrated FIG. 8C, the cranking control unit 53 permits the cranking of the engine 2 with the aid of the motor 8. Accordingly, the motor 8 is driven at a time t4, as illustrated FIG. 8D. As a result, the status of vehicle 1 returns to normal traveling, as illustrated FIG. 8B.

(1) In one or more embodiments of the present invention, the speed V is detected for the vehicle 1 during inertial traveling which is traveling, with fuel supply to the engine 2 kept stopped. The rotational speed threshold determination unit 54 changes the rotational speed threshold Tr depending on the detected speed V. The rotational speed threshold determination unit 54 determines the rotational speed threshold Tr so that the rotational speed threshold Tr may increase with increase in the speed V. In other words, a smaller rotational speed threshold value Tr is set for a slower speed V. Thus, a lower rotational speed threshold Tr is set during low speed traveling, resulting in a smaller cranking noise. Accordingly, speed V enabling inertial traveling without giving the driver a discomfort feeling caused by cranking noise can be expanded to a lower speed range. As a result, when the speed range enabling inertial traveling can be expanded, the fuel efficiency of the vehicle 1 improves.

(2) The rotational speed threshold determination unit 54 sets a maximum value allowable for the cranking mechanism of the engine 2 to the rotational speed threshold Tr for the speed V equal to or higher than a predetermined speed threshold. When the detected speed is less than the predetermined speed threshold, the rotational speed threshold determination unit 54 limits the rotational speed threshold Tr to a value smaller than the maximum value. Thus, a lower rotational speed threshold Tr is set during low speed traveling, resulting in a smaller cranking noise. Accordingly, the speed V enabling inertial traveling without giving the driver a discomfort feeling caused by cranking noise can be expanded to a lower speed range. As a result, when the speed range enabling inertial traveling can be expanded, the fuel efficiency of the vehicle 1 improves.

Modification Example

Figure 9:
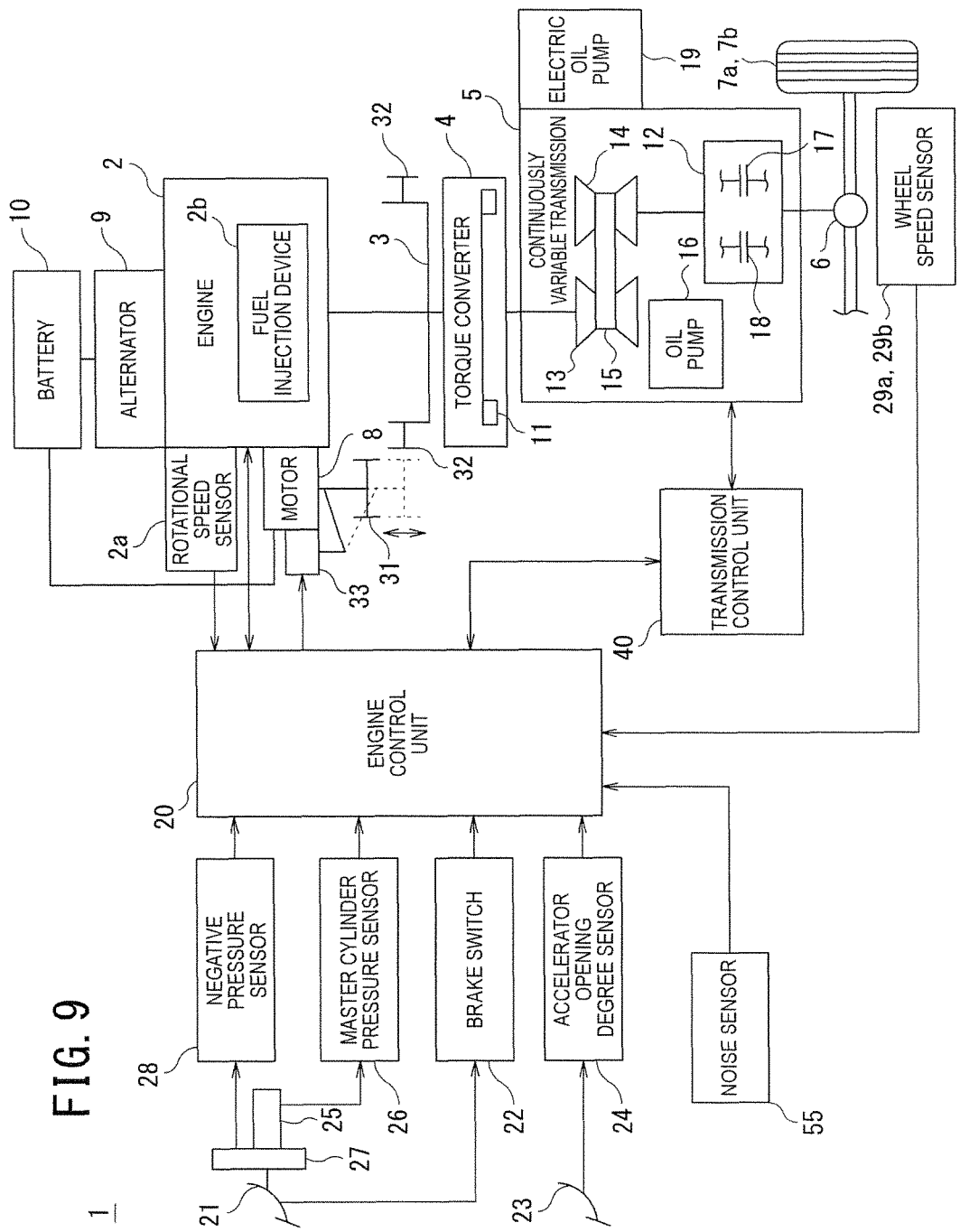
FIG. 9 is a schematic configuration diagram of a vehicle equipped with a vehicle traveling control device according to a modification example.

The rotational speed threshold Tr may be set according not to the speed V but to the magnitude I1 of background noise. The magnitude I1 of the background noise may be measured actually. See FIG. 9. The vehicle 1 may be provided with a noise sensor 55 for measuring the magnitude I1 of the background noise.

Third Embodiment

Next, a third embodiment will be explained. When the engine 2 is stopped, the engine rotational speed Re gradually decreases, bringing the rotation of the engine 2 to stop, but the engine 2 may rotate in a reverse direction before the complete stop of rotation. For this reason, in the third embodiment, the cranking by the motor 8 is prohibited when the engine rotational speed Re of the engine 2 during the reverse rotation is higher than the rotational speed threshold Tr differing depending on the speed V.

Figure 10:
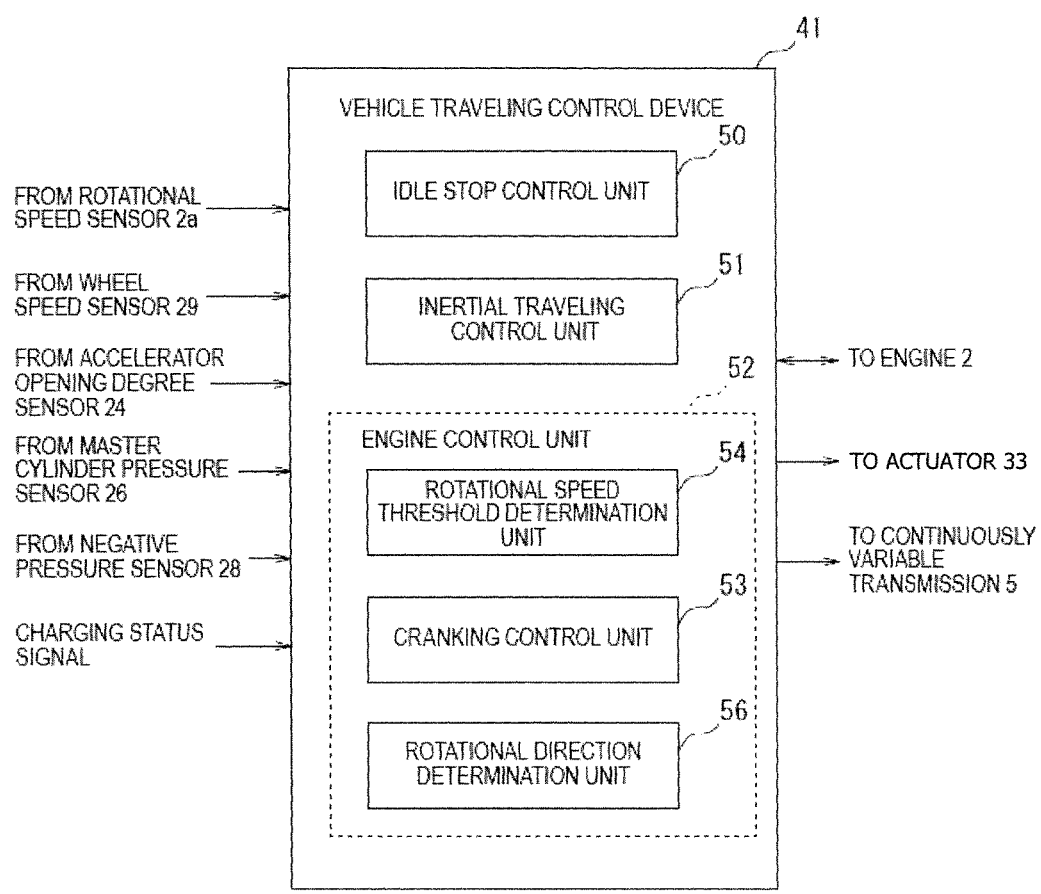
FIG. 10 is a functional configuration diagram of a vehicle traveling control device according to a third embodiment.

See FIG. 10. The same reference signs are used for the components similar to those in the second embodiment. The engine control unit 52 is provided with a rotational direction determination unit 56 for determining whether the engine 2 is during a forward rotation or during a reverse rotation, on the basis of the rotational speed signal from the rotational speed sensor 2a.

When the engine rotational speed Re of the engine 2 during forward rotation is equal to or lower than the first rotational speed threshold Tr1 differing depending on the speed V of the vehicle 1, the cranking control unit 53 permits cranking, and when the engine rotational speed Re is higher than the first rotational speed threshold Tr1, the unit prohibits cranking until the engine rotational speed Re drops to or below the first rotational speed threshold Tr1.

Further, when the engine rotational speed Re of the engine 2 during reverse rotation is equal to or lower than the second rotational speed threshold Tr2 differing depending on the speed V, the cranking control unit 53 permits cranking, and when the engine rotational speed Re is higher than the second rotational speed threshold Tr2, the unit prohibits cranking until the engine rotational speed Re drops to or below the second rotational speed threshold Tr2.

Cranking noise generated during the reverse rotation of the engine 2 tends to be larger than that generated during the forward rotation thereof. Accordingly, cranking may be prohibited at a lower engine rotational speed Re during the reverse rotation of the engine 2 than during the forward rotation thereof. Thus, the rotational speed threshold determination unit 54 may set a value to the second rotational speed threshold Tr2 for the vehicle 1 traveling at the speed V with the engine 2 during reverse rotation, which value is smaller than the first rotational speed threshold Tr1 for the vehicle 1 traveling at the speed V with the engine 2 during forward rotation. In other words, when the speed V detected during the forward rotation of the engine 2 is the same as that detected during the reverse rotation of the engine 2, the first rotational speed threshold Tr1 is larger than the second rotational speed threshold Tr2. For example, the rate of increase in the first rotational speed threshold Tr1 with respect to increase in the speed V may be larger than the rate of increase in the second rotational speed threshold Tr2 with respect to increase in the speed V.

(1) The rotational direction determination unit 56 in one or more embodiments of the present invention determines whether the engine 2 is in forward rotation or in inverse rotation. The cranking control unit 53 permits the restart of the engine 2 when the engine rotational speed Re of the engine 2 during forward rotation is equal to or less than the first rotational speed threshold Tr1 differing depending on the speed V of the vehicle 1. In addition, the cranking control unit 53 permits the restart of the engine 2 when the engine rotational speed Re of the engine 2 during reverse rotation is equal to or less than the second rotational speed threshold Tr2 differing depending on the speed V. Accordingly, the cranking noise occurring upon the restart of the engine 2 during its reverse rotation occurring upon the stop of the engine 2 can be prevented from giving the driver a discomfort feeling.

(2) When the speed V detected during the forward rotation of the engine 2 is the same as that detected during the reverse rotation thereof, the first rotational speed threshold Tr1 is larger than the second rotational speed threshold Tr2. Accordingly, cranking can be prohibited for a lower engine rotational speed Re during the reverse rotation of engine 2 than during the forward rotation thereof. As a result, larger cranking noise can be prevented from occurring during the reverse rotation of the engine 2 than during the forward rotation thereof.

Fourth Embodiment

Next, a fourth embodiment will be explained. The magnitude of the starter noise sensible for the driver fluctuates depending on various factors. In following explanation, a fluctuation factor which fluctuates the magnitude of the starter noise sensible for the driver is simply represented as "fluctuation factor."

Such a fluctuation factor may be, for example, a factor which generates a noise other than the starter noise, making it difficult for motor operation noise to be sensed and fluctuating the magnitude of the starter noise sensible for the driver. Examples of the fluctuation factor include, for example, weather conditions. For example, rainfall increases traveling noise, making it difficult to sense the starter noise. For this reason, the magnitude of the starter noise sensible for the driver is larger than in sunny weather.

Further, examples of the fluctuation factor include an operation status of an audio device and that of a wiper, provided on the vehicle 1. When the audio device and the wiper are used, their operation noises also inhibit the sensing of the starter noise, resulting in increase in the magnitude of the starter noise sensible for the driver.

Still further, examples of the fluctuation factor also include the operation status of a noise reduction device for reducing background noise in the cabin of the vehicle 1. Since the starter noise is significant when background noise is small, the magnitude of starter noise sensible for the driver decreases.

For this reason, the vehicle traveling control device 41 of the fourth embodiment corrects the rotational speed threshold Tr which was set according to the speed V of the vehicle 1 according to a fluctuation factor fluctuating the magnitude of the starter noise sensible for the driver, in addition to the speed V.

Figure 11:
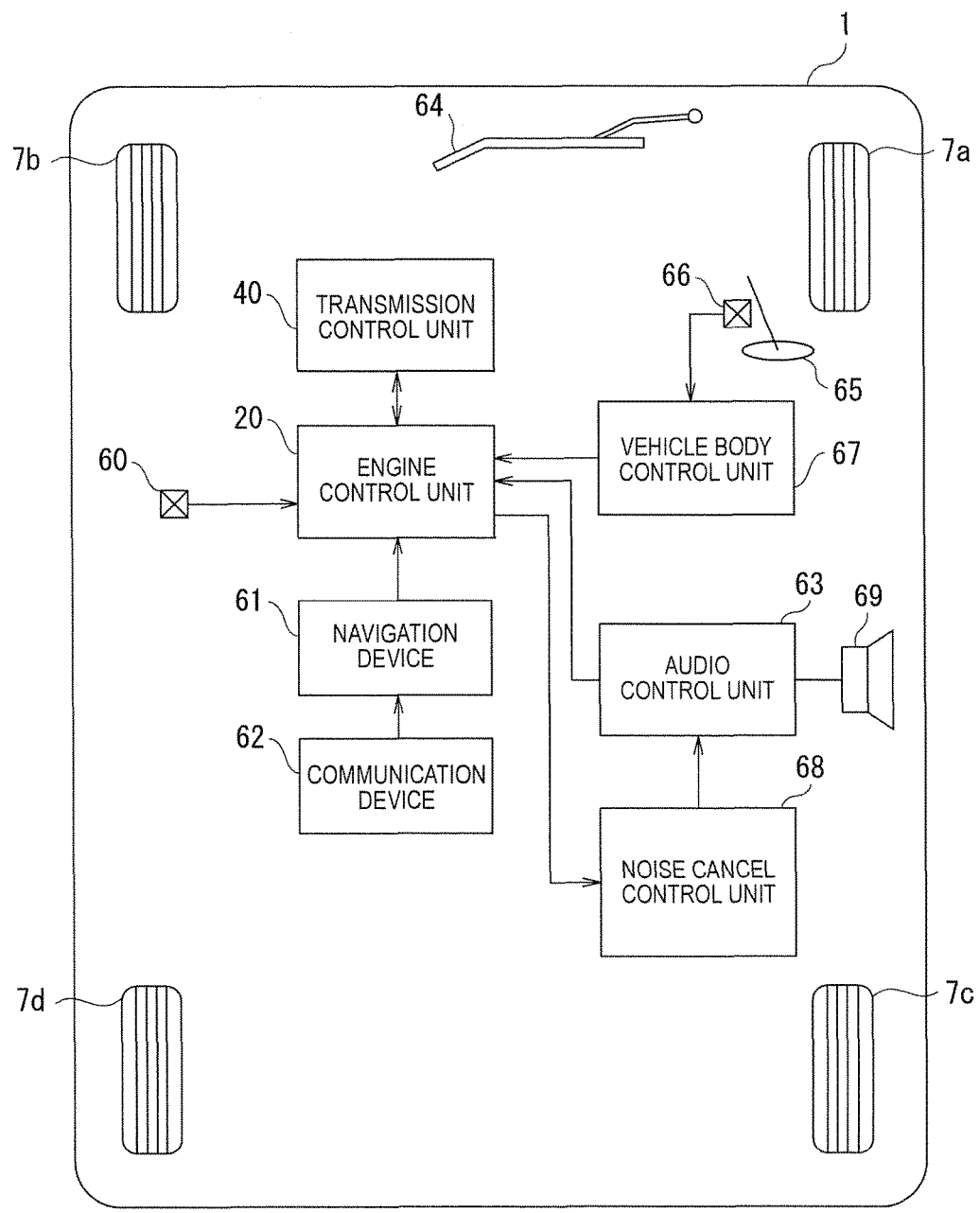
FIG. 11 is a schematic configuration diagram of a vehicle equipped with a vehicle traveling control device according to a fourth embodiment.

See FIG. 11. The same reference signs are used for the components similar to those in the second embodiment. The vehicle 1 is provided with a sensor 60 for detecting a present weather condition at the position of the vehicle 1 and a navigation device 61. The sensor 60 detects the weather condition. For example, the sensor 60 may be a rain sensor for detecting rainfall or a snowfall sensor for detecting snowfall. The sensor 60 inputs information on the detected weather condition to the engine control unit 20.

The navigation device 61 is an information processing device for output, to the engine control unit 20, travel route information for cooperative navigation control. In the cooperative navigation control, the engine control unit 20 controls the speed V of the vehicle 1 according to the degree of a road curve or slope ahead, on the basis of the travel route information. Further, in the cooperative navigation control, the navigation device 61 receives, by using a communication device 62, weather information related to a present weather condition at the position of the vehicle 1 or on a travel route to be traveled. The communication device 62 may receive the weather information via, for example, road-to-vehicle communication, inter-vehicle communication, or satellite communication. The navigation device 61 inputs the received weather information to the engine control unit 20.

The vehicle 1 is also provided with an audio control unit 63 having an audio device such as a compact disc player and a radio. The audio control unit 63 inputs, to the engine control unit 20, a first operation signal indicating the operation status of the audio device and the volume of sound generated by the audio device.

Further, the vehicle 1 is provided with a wiper 64, a steering wheel 65, a wiper switch 66 provided in the vicinity the steering wheel, and a vehicle body control unit 67. The vehicle body control unit 67 detects the operation of the wiper switch 66 and drives the wiper 64 according to the detected operation. The vehicle body control unit 67 outputs, to the engine control unit 20, a second operation signal indicating the operation status of the wiper 64.

In addition, the vehicle 1 is provided with a noise cancel control unit 68 as a noise reduction device. The noise cancel control unit 68 supplies, to the audio control unit 63, an audio signal of an anti-phased sound with respect to background noise in the cabin of the vehicle 1, to output the anti-phased sound from the speaker 69, thereby reducing the background noise in the cabin. To the engine control unit 20 is input a third operation signal indicating the operation status of the noise cancel control unit 68.

The audio control unit 63, the vehicle body control unit 67, and the noise cancel control unit 68 may be computers including a CPU (Central Processing Unit) and a peripheral component for CPU such as a storage device. Respective functions of these computers described herein are implemented by respective CPUs executing a computer programs stored in a storage device. Further, signs 7c and 7d indicate wheels other than drive wheels.

The rotational speed threshold determination unit 54 illustrated in FIG. 4 receives weather information from the sensor 60 and navigation device 61, the first operation signal from the audio control unit 63, the second operation signal from the vehicle body control unit 67, and the third operation signal from the noise cancel control unit 68. The rotational speed threshold determination unit 54 corrects, on the basis of these signals, the rotational speed threshold Tr which was set according to the speed V of the vehicle 1.

For example, when the rotational speed threshold determination unit 54 detects rainfall on the basis of the weather information from the sensor 60 or from the navigation device 61, it estimates the increased magnitude of traveling noise in the vehicle owing to rainfall as an increased magnitude Iv of vehicle interior noise. For example, the rotational speed threshold determination unit 54 may estimate the increased magnitude Iv on the basis of respective increased magnitudes of traveling noise previously measured for respective rainfall amounts. The rotational speed threshold determination unit 54 corrects the rotational speed threshold Tr on the basis of the speed V and the estimated increased magnitude Iv.

Figure 12A:
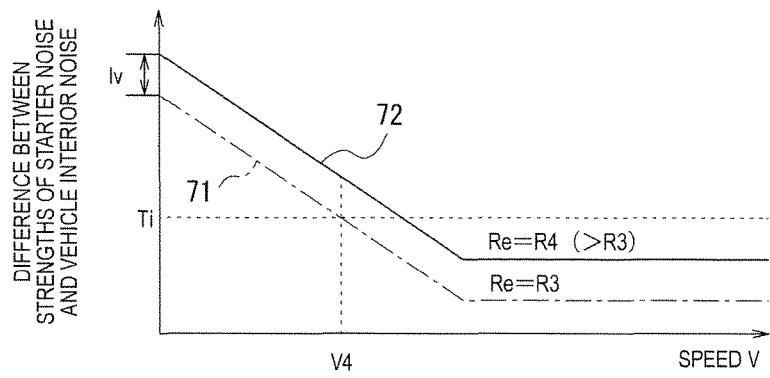
FIG. 12A is an explanatory drawing of a second setting example of the rotational speed threshold and FIG. 12B is an explanatory drawing of a third setting example of the rotational speed threshold.

FIG. 12A illustrates a difference (I0–I1) between the magnitude of vehicle interior noise before its fluctuation owing to rainfall and the magnitude of the starter noise. The dot-dash line 71 indicates the difference (I0–I1) for an engine rotational speed Re equal to "R3." The solid line 72 indicates the difference (I0–I1) for an engine rotational speed Re equal to "R4" higher than "R3."

In addition, when the speed V of the vehicle 1 is "V4", the difference (I0–I1) is an allowable value Ti at an engine rotational speed Re equal to "R3". The difference (I0–I1) for an engine rotational speed Re equal to "R4" is larger than the difference (I0–I1) for an engine rotational speed Re equal to "R3", and the difference between them is equal to the increased magnitude Iv.

Accordingly, the rotational speed threshold determination unit 54 sets "R3" to the rotational speed threshold Tr before traveling noise in the cabin increases owing to rainfall. After the traveling noise in the cabin increases by the increased magnitude Iv owing to rainfall, the difference (I0–I1) is the allowable value Ti at an engine rotational speed Re equal to "R4". Therefore, after traveling noise in the cabin increases owing to rainfall, the rotational speed threshold determination unit 54 corrects the rotational speed threshold Tr to "R4."

The rotational speed threshold determination unit 54 estimates respective differences (I0–I1) for different combinations of the engine rotational speed Re and the speed V, and on the basis of which estimated values, the rotational speed threshold determination unit further estimates a rotational speed threshold Tr at which a difference (I0–I1–Iv) obtained by subtraction of the increased magnitude Iv from the estimated values, is the allowable value Ti.

Further, the rotational speed threshold determination unit 54 estimates, on the basis of the first operation signal from the audio control unit 63, the increased magnitude Iv of vehicle interior noise which increases owing to the operation of the audio function.

Still further, for example, the rotational speed threshold determination unit 54 estimates, on the basis of the second operation signal from the vehicle body control unit 67, the increased magnitude Iv of vehicle interior noise which increases owing to the use of the wiper 64. The rotational speed threshold determination unit 54 estimates the rotational speed threshold Tr on the basis of the estimated increased magnitude Iv. When a fluctuation factor occurs which generates a noise other than starter noise, thereby fluctuating the magnitude of starter noise sensible for the driver, the rotational speed threshold determination unit 54 may correct the rotational speed threshold Tr to the maximum value allowable for the cranking mechanism of the engine 2 regardless of the speed V.

Further, for example, the rotational speed threshold determination unit 54 may estimate, on the basis of the third operation signal from the noise cancel control unit 68, the magnitude of background noise reduced by the noise cancel control unit 68. For example, the rotational speed threshold determination unit 54 may estimate the decreased magnitude Iv of background noise, on the basis of the functional specification of the noise cancel control unit 68. The rotational speed threshold determination unit 54 corrects, on the basis of the estimated decreased magnitude Iv, the rotational speed threshold Tr which was set according to the speed V.

Figure 12B:
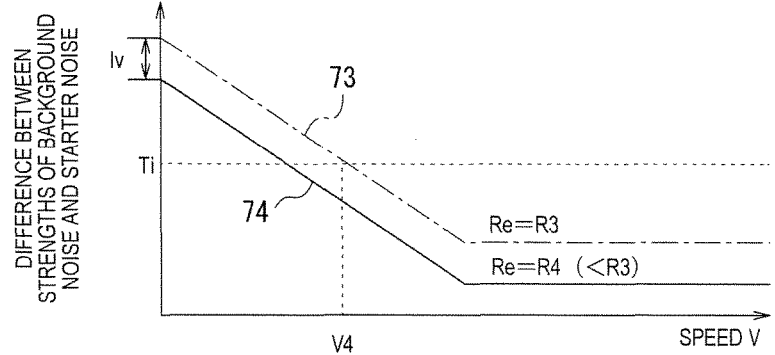

FIG. 12B illustrates the difference (I0–I1) between the magnitude of background noise before its reduction by the noise cancel control unit 68 and the magnitude of the starter noise. The dot-dash line 73 indicates the difference (I0–I1) for an engine rotational speed Re equal to "R3." The solid line 74 indicates the difference (I0–I1) for an engine rotational speed Re equal to "R4" lower than "R3."

Further, when the speed V of the vehicle 1 is "V4", the difference (I0–I1) is the allowable value Ti at an engine rotational speed Re equal to "R3". Still further, the difference (I0–I1) for an engine rotational speed Re equal to "R4" is smaller than the difference (I0–I1) for an engine rotational speed Re equal to "R3", and the difference between them is equal to the decreased magnitude Iv.

Accordingly, when the noise cancel control unit 68 is not in operation, the rotational speed threshold determination unit 54 sets "R3" to the rotational speed threshold Tr. When the noise cancel control unit 68 is in operation, the difference (I0–I1) is the allowable value Ti at an engine rotational speed Re equal to "R4". Accordingly, when the noise cancel control unit 68 is in operation, the rotational speed threshold determination unit 54 corrects the rotational speed threshold Tr to "R4."

The rotational speed threshold determination unit 54 estimates respective differences (I0–I1) for different combinations of the engine rotational speed Re and the speed V, and on the basis of which estimated values, the rotational speed threshold determination unit further estimates a rotational speed threshold Tr at which a sum (I0–I1+Iv) of the estimated values and the decreased magnitude Iv is the allowable value Ti.

(1) The rotational speed threshold determination unit 54 in one or more embodiments of the present invention detects a fluctuation factor which generates a noise other than starter noise occurring upon the engagement of the pinion gear 31 on the engine 2 during inertial rotation with the ring gear 32 on the motor 8, thereby fluctuating the magnitude of starter noise sensible for the driver of the vehicle 1. The rotational speed threshold determination unit 54 corrects the rotational speed threshold Tr according to the fluctuation factor. Accordingly, an appropriate rotational speed threshold Tr can be used according to the occurrence of the fluctuation factor. For example, when starter noise is difficult to hear owing to the fluctuation factor, the rotational speed threshold Tr can be set larger. This makes it possible to expand more the range of speed V enabling the first inertial traveling. As a result, the fuel efficiency of the vehicle 1 can be improved.

(2) The rotational speed threshold determination unit 54 corrects the rotational speed threshold Tr according to the operation status of the noise reduction device for reducing background noise in the cabin of the vehicle 1. Therefore, an appropriate rotational speed threshold Tr can be used according to the occurrence of the fluctuation factor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 . . . vehicle, 2 . . . engine, 2a . . . rotational speed sensor, 3 . . . drive plate, 4 . . . torque converter, 5 . . . continuously variable transmission, 6 . . . differential gear, 7a and 7b . . . drive wheel, 7c and 7d . . . wheel, 8 . . . motor, 9 . . . alternator, 10 . . . battery, 11 . . . lock-up clutch, 12 . . . forward-reverse switching mechanism, 13 . . . primary pulley, 14 . . . secondary pulley, 15 . . . belt, 16 . . . oil pump, 17 . . . forward clutch, 18 . . . reverse brake, 19 . . . electric oil pump, 20 . . . engine control unit, 21 . . . brake pedal, 22 . . . brake switch, 23 . . . accelerator pedal, 24 . . . accelerator pedal opening degree sensor, 25 . . . master cylinder, 26 . . . master cylinder pressure sensor, 27 . . . master back, 28 . . . negative pressure sensor, 29a and 29b . . . wheel speed sensor, 31 . . . pinion gear, 32 . . . ring gear, 33 . . . actuator, 40 . . . transmission control unit, 41 . . . vehicle traveling control device, 50 . . . idle stop control unit, 51 . . . inertial traveling control unit, 52 . . . engine control unit, 53 . . . cranking control unit, 54 . . . rotational speed threshold determination unit, 55 . . . noise sensor, 56 . . . rotational direction determination unit, 60 . . . sensor, 61 . . . navigation device, 62 . . . communication device, 63 . . . audio control unit, 64 . . . wiper, 65 . . . steering wheel, 66 . . . wiper switch, 67 . . . vehicle body control unit, 68 . . . noise cancel control unit, 69 . . . speaker

The invention claimed is:

1. An engine control method, comprising:
    determining an intention of a driver for acceleration during vehicle traveling;
    stopping fuel supply to an engine when a determination is made that the driver does not have the intention for acceleration;
    detecting a speed of the vehicle during inertial traveling, with fuel supply to the engine kept stopped;
    permitting restart of the engine when a determination is made that the driver has the intention for acceleration after stopping the fuel supply to the engine;
    prohibiting the restart of the engine until an engine rotational speed drops to or below a predetermined engine rotational speed threshold, even when the restart of the engine is permitted;
    restarting the engine after the engine rotational speed drops to or below the predetermined engine rotational speed threshold; and
    changing the predetermined engine rotational speed threshold depending on the detected vehicle speed,
    wherein the predetermined engine rotational speed threshold increases with increase in the detected vehicle speed.

2. The engine control method according to claim 1, wherein, when the detected vehicle speed is equal to or higher than a predetermined vehicle speed threshold, the predetermined engine rotational speed threshold is set to be a maximum value allowable for a cranking mechanism of the engine, and
    wherein, when the detected vehicle speed is lower than the predetermined vehicle speed threshold, the predetermined engine rotational speed threshold is limited to a value smaller than the maximum value.

3. The engine control method according to claim 1, comprising:

determining whether the engine is in forward rotation or reverse rotation;

permitting the restart of the engine when the engine rotational speed during forward rotation is equal to or less than a first engine rotational speed threshold differing depending on the detected vehicle speed; and permitting the restart of the engine when the engine rotational speed during reverse rotation is equal to or less than a second engine rotational speed threshold that is determined separately from the first rotational speed threshold and is differing depending on the detected vehicle speed.

4. The engine control method according to claim 3, wherein the first engine rotational speed threshold is larger than the second engine rotational speed threshold when the vehicle speed detected during the forward rotation of the engine is the same as the vehicle speed detected during the reverse rotation of the engine.

5. The engine control method according to any one of claim 1, comprising:

detecting a fluctuation factor generating a noise other than a noise occurring upon engagement of a first gear on the engine during inertial rotation with a second gear on a motor for starting the engine, to fluctuate a magnitude of the noise sensible for a driver of the vehicle; and correcting the predetermined engine rotational speed threshold according to the detected fluctuation factor.

6. A vehicle traveling control device configured to make a vehicle travel by inertia with fuel supply to an engine kept stopped during traveling of the vehicle, the vehicle traveling control device comprising:

an engine rotational speed detector configured to detect an engine rotational speed;

an accelerator depression degree detector configured to detect degree of an accelerator depressed by a driver;

a motor configured to start the engine from a stopped status;

a fuel injector configured to adjust fuel to be supplied to the engine; and a controller configured to control the motor and the fuel injector; and a sensor configured to detect a speed of the vehicle traveling by inertia wherein, when no accelerator depression degree is detected, the controller device stops fuel supply to the engine, and wherein, when the accelerator is depressed after stopping the fuel supply to the engine, the controller device prohibits the engine to be restarted until the engine rotational speed drops to or below a predetermined engine rotational speed threshold, and then, restarts the engine with aid of the motor after the engine rotational speed drops to or below the predetermined engine rotational speed threshold, wherein the controller changes the predetermined engine rotational speed threshold depending on the detected vehicle speed, and wherein the predetermined engine rotational speed threshold increases with increase in the detected vehicle speed.

\* \* \* \* \*